(No Model.)  2 Sheets—Sheet 1.
W. J. MILLER.
INGREDIENT SCALE.
No. 245,853. Patented Aug. 16, 1881.
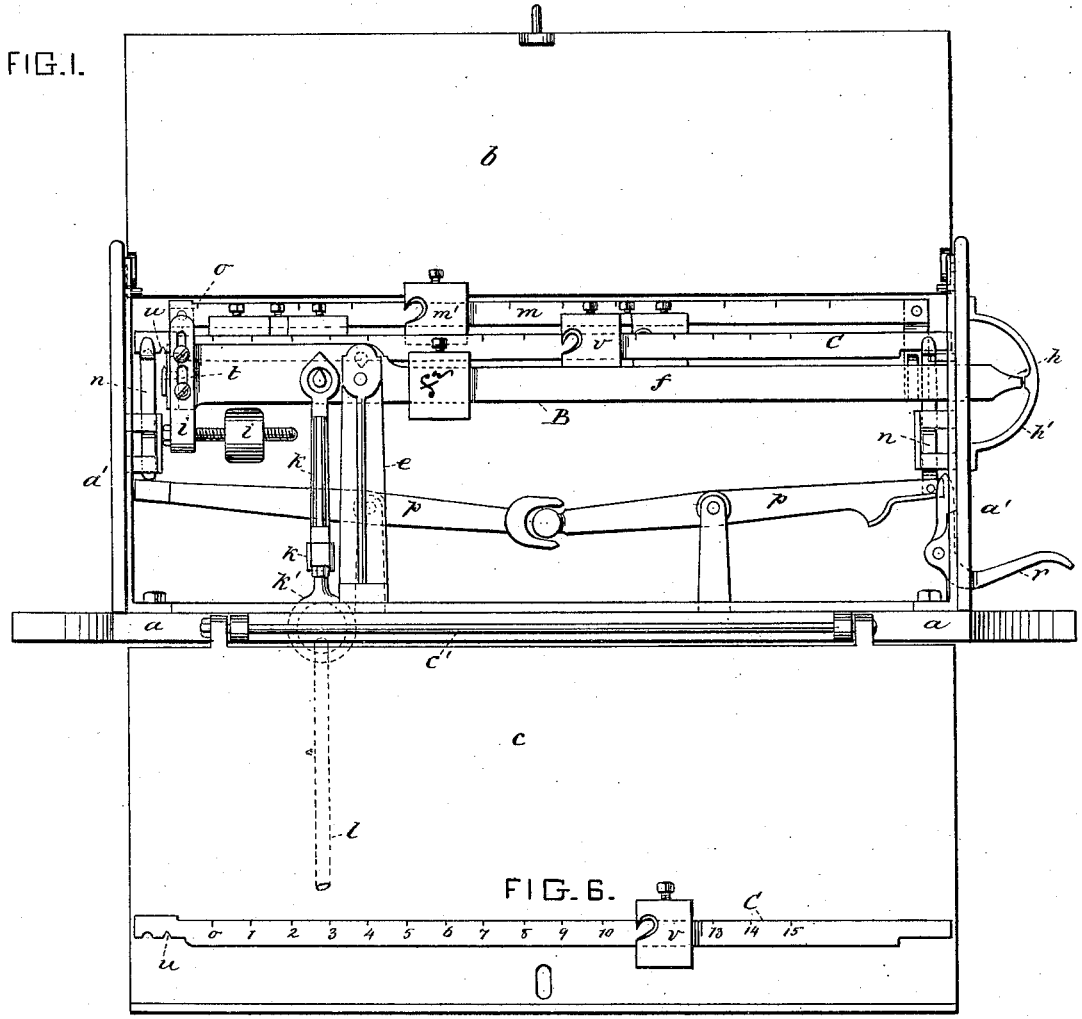
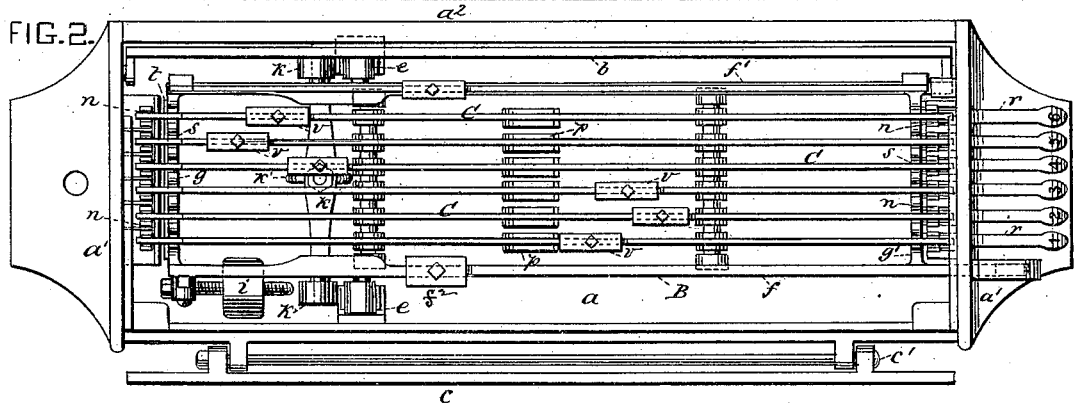
WITNESSES:
E. Wolff
W. Booth
INVENTOR:
Wm. J. Miller
by Chas. M. Higgins
Attorney (No Model.) 2 Sheets—Sheet 2.
W. J. MILLER.
INGREDIENT SCALE.
No. 245,853. Patented Aug. 16, 1881.
FIG. 3. FIG. 4.
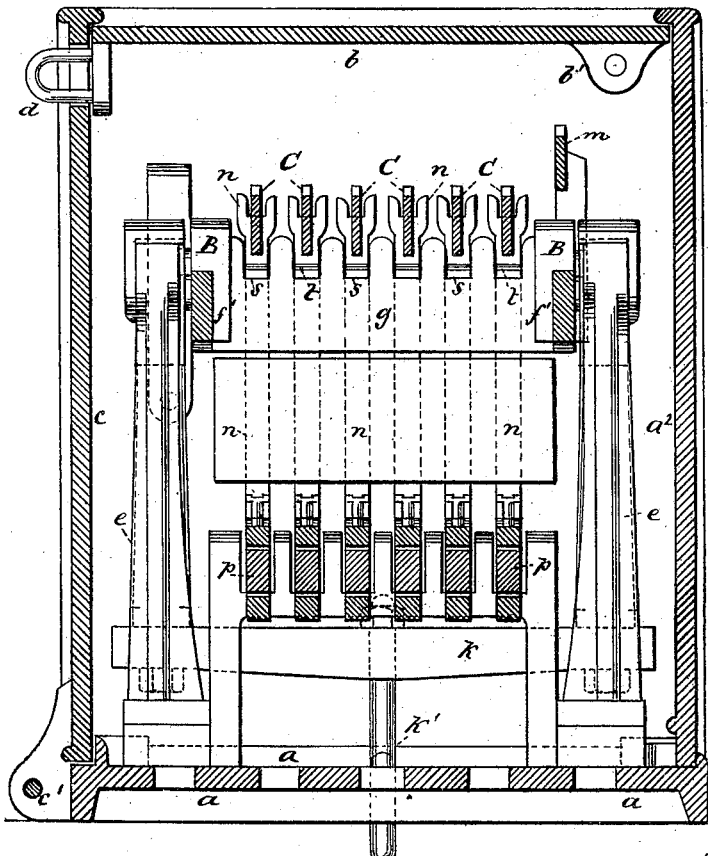
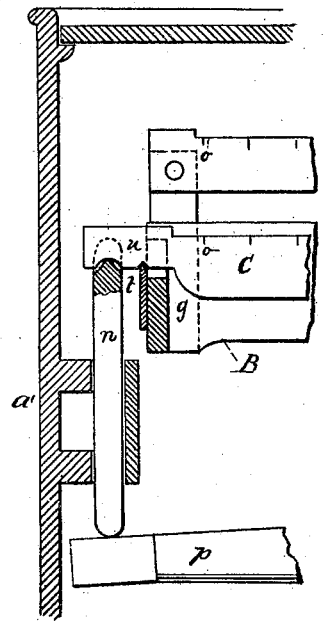
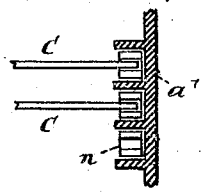
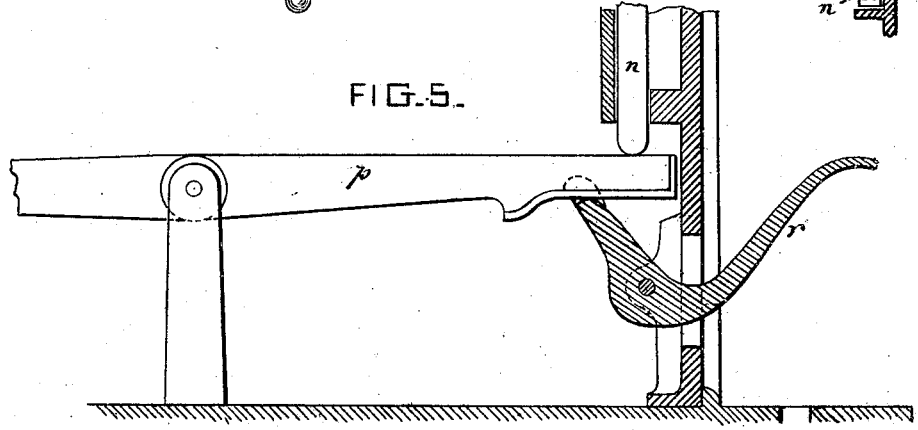
FIG. 7. (Plan.)
FIG. 5.
WITNESSES:
E. Wolff
W. Booth
INVENTOR:
Wm. J. Miller
by Chas. M. Higgins
Attorney
N. PETERS, Photo-Lithographer, Washington, D. C.

UNITED STATES PATENT OFFICE.

WILLIAM J. MILLER, OF MAMARONECK, NEW YORK, ASSIGNOR TO E. & T. FAIRBANKS & CO., OF ST. JOHNSBURY, VERMONT.

INGREDIENT-SCALE.

SPECIFICATION forming part of Letters Patent No. 245,853, dated August 16, 1881.

Application filed June 6, 1881. (No model.)

*To all whom it may concern:*

Be it known that I, WILLIAM J. MILLER, of Mamaroneck, Westchester county, New York, (assignor to E. & T. FAIRBANKS & CO., of St. Johnsbury, Vermont,) have invented certain new and useful Improvements in Weighing-Scales, of which the following is a specification.

My invention relates more especially to scales adapted to weigh set proportions or quantities of different ingredients entering into the composition of any mixture or manufactured product without exposing the scale-beam or making the quantity known to the outsider, or even to the workman who loads the scale, whereby the special formulas of manufactures may be thus kept secret.

The present scale has been more especially designed and intended for weighing the charges of the different ingredients, such as ore, flux, and fuel fed to blast-furnaces; but it may of course be used for any similar proportional weighing where secrecy is desirable.

The main peculiarity of this class of scales lies in the beam portion, which is inclosed in a locked case, from which the steelyard-rod extends to connect the beam with the platform-levers, and through which case the free end or index-point of the beam protrudes to show when the beam becomes balanced by the load applied. The remainder of these scales—that is, the platform and lever mechanism—is of the usual construction of platform-scales, and hence the annexed drawings of my improvement show only the beam portion and its immediate adjuncts, and the case inclosing the same.

Now, the beam in scales of this class has usually a multiple construction—that is, it usually consists of a main beam and a number of minor beams. The main beam, which serves as a supporting-frame for the minor beams, is hung, pivoted, and connected by a steelyard-rod with the platform-levers in the usual way, and is provided with the usual adjustable poises or weights for balancing the beam, and also an adjustable poise or weight for setting off the tare of the wheelbarrow, truck, or other receptacle used in holding and transporting the material being weighed. The minor beams are of any suitable number according to the number of ingredients which the scale is designed to weigh, and they are each graduated and provided with an adjustable weight or poise, which may be set to the weight desired for any particular ingredient, and they are so organized relatively to the main beam that all the minor or ingredient beams may be thrown out of action into a zero or neutral position; but when it is desired to weigh a charge of any one ingredient, the beam corresponding thereto and identified with it by a letter or figure is thrown into action, say, by a marked pull-knob from the exterior of the case. The ingredient is then loaded on the platform till the protruding or index point of the main beam is seen to rise and balance, which thus indicates the proper charge of that ingredient, although its weight remains unknown to the weigher or other outsider not in the confidence of the keeper or owner of the scales.

Now, the beam portion of my improved scales has the same general plan as above described; but its special construction is materially different and novel, and forms an important improvement in scales of this class. Thus, while heretofore the ingredient-beams have been so arranged relatively to the main beam that they always remain connected therewith, whether in or out of action, an important feature of my invention consists in that the ingredient-beams are completely detachable and are lifted and bodily removed from the main beam when thrown out of action and replaced when put in action, whereby the accuracy and simplicity of the scales are greatly increased.

Another important feature of my invention consists in the construction of the ingredient or weighing beams, which are graduated along their entire length, supported at their extremities at the extremity of the main beam with the poise or weight adjustable thereon along both the long and short arms past the fulcrum-point of the main beam, whereby the whole length is utilized, and a beam of much greater range or scope obtained within the same length heretofore used.

My invention is also embodied in the devices for lifting or moving the ingredient-beams on or off the main beam, and in certain other details, as hereinafter fully set forth.

In the annexed drawings, Figure 1 presents a front elevation of my improved scale-beam and adjuncts, with its inclosing-case, the lids of which are shown opened, exposing the beam, &c. Fig. 2 is a plan view of Fig. 1, and Fig. 3 is an enlarged cross-section on lines $x$ $x$ of Figs. 1 and 2. Fig. 4 is an enlarged detail view at the zero end of the beams. Fig. 5 is a similar detail view at the opposite end, showing more particularly the lifting or unshipping mechanism. Fig. 6 gives a front elevation of one of the ingredient-beams detached and bodily removed from the scale. Fig. 7 is a fragmentary plan illustrating a modification.

In the drawings, $a$ $a'$ $a^2$ $b$ $c$ indicate the case which incloses the beam and its adjuncts, and which is closed and locked while the scale is in use. This case is supported in the usual manner on the top of the pillars which rise above the platform-casing, and it is preferably made of cast-iron, with a fixed base, $a$, fixed ends $a'$, and fixed back $a^2$. The top $b$ is hinged at the back at $b'$, Fig. 3, forming a lid which swings up, as shown in Figs. 1 and 2. The front $c$ forms another lid hinged at the bottom at $c'$ to swing down, as shown in Figs. 1 and 2. These two lids when opened thus fully expose the beam at the top and front, as seen in Figs. 1 and 2, enabling the same to be adjusted as desired, after which they are closed to conceal the beam, and a staple, $d$, on the top lid, $b$, protrudes through a slot in the front lid, $c$, to receive a padlock, whereby the case may be securely locked to preserve the secrecy of the scale.

From the base of the case arise two standards, $e$ $e$, on which the main beam B is pivoted, as seen best in Figs. 1 and 3. This main beam is made in the form of an open rectangular frame, its two side bars, $f$ $f'$, being pivoted on the standards in an ordinary manner and joined at its extremities by two cross-bars, $g$ $g'$. The front bar, $f$, protrudes at the end of its long arm through a slot in the end of the case, as indicated at $h$ in Fig. 1, forming the index-point of the beam, which shows to the weigher by its rise and register with a point on the yoke $h'$ the balance of the beam, as will be understood.

The short arm of the beam is provided with the usual adjusting-device $i$ for balancing the beams, and from the short arm also depends a yoke or loop, $k$, (see Figs. 1 and 3,) from the center of which hangs an eye, $k'$, which protrudes through the base of the case and couples with the top end of the steelyard-rod $l$, Fig. 1, which extends downward and connects with the lever mechanism below the platform in substantially the usual way of scales of this class, whereby the weight or load on the platform is transmitted to the beam.

Now, the main beam is provided with a fixed graduated scale-bar or minor beam, $m$, which is raised above the inner side bar, $f'$, of the main beam, and is fixed and supported at its opposite extremities at the opposite ends of the main beam, but is isolated between these supports, as shown best in Fig. 1, and is furnished with a movable poise or weight, $m'$, which is adjustable along the whole length of the beam, past the fulcrum-point over long and short arm alike. Hence the zero-point of this beam is not over the fulcrum-point, as is usual, but at the extremity of the short arm, as shown at $o$ in Fig. 1, and the graduations are made of equal length for equal increments from this point to the opposite or long arm extremity of the beam, so that the long and short arms are utilized alike, and the poise is movable along the same, so that a much longer length of graduation and a scale of much greater scope or range is obtained within the same length of beam heretofore used. This particular scale-bar $m$ is not, however, intended for weighing charges of materials, although it can be so used, but is designed simply to set off the tare of the receptacle, truck, or barrow in which the charge is loaded, as will be understood. The side bar, $f$, of the main beam is also provided with a movable poise, $f^2$, which may be used either to balance or adjust the beam or set off tare, as will be understood.

Now, the most peculiar feature of my invention lies in the ingredient-beams C C, which in the present scales are six in number, although the number may be more or less, according to the number of ingredients for which the scale is adapted; but six are usually ample. These beams are in this case all arranged in parallel horizontal range in or over the open frame of the main beam, like the bars of a grate, as well shown in Figs. 2 and 3. When the ingredient-beams are out of action they are entirely removed from or raised off the main beam, as seen in Figs. 1 and 3, and are then supported at their opposite ends on the forked tips of upright slide-bars $n$ $n$, which are guided in ways on each end of the case and rest on coupled toggle-levers $p$ $p$, which are actuated at one end by cam-levers or finger-keys $r$ $r$, the operating-arms of which protrude through the end of the case, and are lettered or numbered distinctly, as shown in Fig. 2, whereby each key and ingredient-beam may always be identified with one ingredient. It will hence be seen that when one of the finger-keys $r$ are raised, as in Fig. 5, the ingredient-beam corresponding thereto will be dropped onto the main beam, as partly shown in the detail Fig. 4, and hence the main beam will be properly weighted for the charge of the ingredient identified therewith, which may thence be loaded and weighed on the platform. When the ingredient-beams are thus dropped onto the main beam they fall into notches $s$ on the cross-bars $g$ $g'$ of the main beam, and each ingredient-beam has a notch, $u$, of sharp V or other form, which engages with a knife-edge, $t$, or similar projection fixed along the cross-bar, $g$, which insures the true register of the ingredient-beam with the main beam when falling into position thereon. Now, the ingredient-beams are all graduated similar to the tare-bar m, already described—that is, their zero-point is at the end of the short arm, from which the graduations extend in equal spaces for equal increments from this end past the fulcrum-point to the opposite end, as illustrated in Figs. 1 and 6, thus obtaining a beam of great range in a short length, and thus producing a compact scale of large weighing scope. It may now be seen that not only are the ingredient-beams actually removed from the main beam when thrown out of action, but that they simply rest on the slide-bars n n, and may be bodily lifted off and taken out of the scale, as shown in Fig. 6, where the poise or weight v may then be very conveniently adjusted to any desired graduation, according to the charge desired of the ingredient which it represents. In addition to this advantage of easy removal of the beam and adjustment of the poise, it will be observed that there is no liability of displacing the poise when the beam is replaced by the moving of the beams into or out of action, as the poises are not brought in contact with any other parts, as is the case in former scales.

It may be further remarked that another peculiarity of the beam in my scale lies in the fact that it consists in reality of a number of distinct beams, yet it has but one fulcrum or set of pivots.

The operation of the scale may now be readily understood. Thus, the weights being adjusted on the several ingredient-beams according to the proportions desired by the master of the scale, and the tare of the wheelbarrow or other receptacle being set off on the tare-bar m, the lids of the case are then closed and locked and the finger-keys r are all depressed to raise the ingredient-beams out of action. The weigher or workmen are then ordered by the master, for instance, to feed to the furnace, say, so many charges of ingredient No. 1, so many of No. 2, and so on, which, being done, it will be observed that the desired proportions of ingredients will enter the furnace without the outsider or workmen being able to tell what the quantities are, so that hence the special formulas of manufactures, often valuable and highly prized, are thus kept secret to themselves or to those in their confidence.

It may be understood from the description already given that there is no necessity to limit myself to the exact construction detailed, for this may be modified in several respects without in any way departing from the leading plan. Thus, instead of having the main beam in the form of an open frame placed in horizontal plane, with the ingredient-beams in horizontal parallel range thereon, the main beam may be in the form of an open frame placed in vertical plane, with the ingredient-beams arranged to fit thereon one above the other in parallel superposed order.

Instead of having the toggle-levers p p coupled by a form of knee-joint, segments of gear-teeth may be formed in the meeting ends thereof to intermesh. I also prefer to have the lifting slide-bars n n move between webs projecting from the ends of the case, as in Fig. 7, between which the ends of the ingredient-beams will enter, so that it will be impossible to displace the ingredient-bars, no matter how hurriedly or roughly they may be raised off or dropped onto the main beam.

What I claim is—

1. An ingredient-weighing scale constructed with a main-beam to which the load is transmitted, and a number of minor or ingredient-beams weighted to represent proportions of ingredients, and adapted to be thrown into or out of action with the main beam in such order as to be completely removed from or raised off the main beam when thrown out of action, and individually deposited thereon when thrown into action, substantially as herein set forth.

2. An ingredient-weighing scale provided with a main beam and one or more minor or ingredient-beams, movable onto or off the main beam, and formed to be isolated along its mid-length, and supported at its opposite extremities at the ends of the long and short arms of the main beam, and graduated from a zero-point at or near the end of the short arm of the main beam past the fulcrum-point thereof toward the extremity of the long arm, with an adjustable poise or weight movable thereon from end to end, substantially as and for the purpose set forth.

3. An ingredient-weighing scale constructed with a main beam to which the load is transmitted, and one or more minor or ingredient-beams weighted to represent proportions of ingredients, arranged to be raised off or deposited onto the main beam, and also bodily detachable and removable from the scale, substantially as and for the purpose set forth.

4. An ingredient-weighing scale constructed with a main beam to which the load is transmitted, and formed as a supporting-frame, in combination with a number of minor or ingredient beams, representing the proportions of ingredients, and arranged in parallel order, or nearly so, within or along the main or frame beam, together with shifting mechanism organized to bodily lift or remove the said ingredient-beams off from the main beam, or to drop or deposit any one thereof onto the main beam, substantially as and for the purpose set forth.

5. In an ingredient-weighing scale, the combination with a main beam and one or more minor or ingredient-beams arranged to move off from or onto the main beam, of a knife edge or projection on one beam and a corresponding notch or recess in the other, to engage together and insure the true register of the main with the minor beam when thrown into action, substantially as herein shown and described.

6. In an ingredient-weighing scale, a main beam, B, formed as a supporting-frame, and provided with one fixed graduated scale-bar, $m$, in combination with a number of removable ingredient-beams, C, movable onto or off the main frame-beam, substantially as and for the purpose set forth.

7. The combination, with the main beam of an ingredient-weighing scale, of minor or ingredient-beams C, movable onto or off the same, and shifting slide-bars $n$ $n$, together with suitable mechanism to operate the same, arranged to shift the minor beams onto or off the main beam, substantially as herein shown and described.

WILLIAM J. MILLER.

Witnesses:
CHAS. M. HIGGINS,
WILLIAM G. BOOTH.